(12) United States Patent
Wang et al.

(10) Patent No.: US 11,769,466 B2
(45) Date of Patent: Sep. 26, 2023

(54) IMAGE DISPLAY METHOD AND APPARATUS, DEVICE, AND STORAGE MEDIUM

(71) Applicant: BEIJING BYTEDANCE NETWORK TECHNOLOGY CO., LTD., Beijing (CN)

(72) Inventors: Peng Wang, Beijing (CN); Xiaohui Shen, Beijing (CN); Yan Wang, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 17/886,820

(22) Filed: Aug. 12, 2022

(65) Prior Publication Data

US 2022/0383836 A1   Dec. 1, 2022

Related U.S. Application Data

(63) Continuation of application No. PCT/CN2021/080071, filed on Mar. 10, 2021.

(30) Foreign Application Priority Data

Apr. 21, 2020 (CN) .......................... 202010319087.4

(51) Int. Cl.
*G09G 5/14* (2006.01)
(52) U.S. Cl.
CPC ......... *G09G 5/14* (2013.01); *G09G 2340/045* (2013.01); *G09G 2340/125* (2013.01)
(58) Field of Classification Search
None
See application file for complete search history.

(56) References Cited

U.S. PATENT DOCUMENTS

2003/0142751 A1*  7/2003  Hannuksela ......... H04N 19/142
                                                375/E7.076
2004/0105594 A1*  6/2004  Blake ...................... G06T 7/194
                                                382/164

(Continued)

FOREIGN PATENT DOCUMENTS

CN          1694512 A       11/2005
CN        101227680 A        7/2008
(Continued)

OTHER PUBLICATIONS

International Patent Application No. PCT/CN2021/080071; Int'l Search Report; dated May 21, 2021; 3 pages.

(Continued)

*Primary Examiner* — David H Chu
(74) *Attorney, Agent, or Firm* — BakerHostetler

(57) ABSTRACT

Embodiments of the present application provide an image display method and apparatus, a device, and a storage medium. The method comprises: displaying a preceding image in a first display period, the preceding image comprising a video image sequence or a single image; superimposing a foreground target area of a succeeding image on an upper layer of the preceding image in a second display period for display, the succeeding image comprising a video image sequence or a single image; and displaying the succeeding image in a third display period. According to the method, a good playback effect can be achieved in scenarios where time variations are desired.

20 Claims, 6 Drawing Sheets

(56) References Cited

U.S. PATENT DOCUMENTS

| | | | |
|---|---|---|---|
| 2011/0169823 A1* | 7/2011 | Barenburg | G06T 15/205 |
| | | | 345/419 |
| 2014/0232814 A1 | 8/2014 | Malhotra et al. | |
| 2019/0384984 A1 | 12/2019 | Rav-Acha et al. | |
| 2020/0221165 A1* | 7/2020 | Losev | H04N 5/262 |

FOREIGN PATENT DOCUMENTS

| | | |
|---|---|---|
| CN | 103246673 A | 8/2013 |
| CN | 103491335 A | 1/2014 |
| CN | 104090709 A | 10/2014 |
| CN | 109684489 A | 4/2019 |
| CN | 110308961 A | 10/2019 |
| CN | 110460908 A | 11/2019 |
| CN | 110688043 A | 1/2020 |
| CN | 110786002 A | 2/2020 |
| JP | 2006-217221 A | 8/2006 |
| TW | 486663 B | 5/2002 |
| WO | WO 2014/035144 A1 | 3/2014 |
| WO | WO 2017/149742 A1 | 9/2017 |

OTHER PUBLICATIONS

European Patent Application No. 21792548.6; Extended Search Report; dated Mar. 24, 2023; 12 pages.

* cited by examiner

IMAGE DISPLAY METHOD AND APPARATUS, DEVICE, AND STORAGE MEDIUM

REFERENCE TO RELATED APPLICATION

This application is a continuation of International Patent Application No. PCT/CN2021/080071, titled "IMAGE DISPLAY METHOD AND APPARATUS, DEVICE, AND STORAGE MEDIUM", filed on Mar. 10, 2021, which claims priority to Chinese Patent Application No. 202010319087.4, titled "IMAGE DISPLAY METHOD, APPARATUS, DEVICE AND STORAGE MEDIUM", filed on Apr. 21, 2020, both of which are incorporated herein by reference in their entireties.

FIELD

Embodiments in the present disclosure relate to the technical field of image display, and in particular, to an image display method, an apparatus, a device, and a storage medium.

BACKGROUND

Various video and image processing applications are widly applied to mobile terminals, which provide convenience for users to process videos and images. These applications usually support the function of splicing multiple videos and/or images to obtain a spliced video, or a function of using multiple images to make a dynamic album that can be played automatically.

In the playback of a spliced video or a dynamic album, transition effects are usually added between two adjacent videos and/or images to achieve a natural transition and improve the playback effect.

Although there are some implementations of transition effects at present, it is required to develop more new implementations for transition effects to improve the playback effect of spliced videos and/or dynamic albums.

SUMMARY

According to embodiments of the present disclosure, an image display method, an apparatus, a device, and a storage medium are provided, so as to achieve the purpose of improving the playback effect of spliced videos and/or dynamic albums.

In a first aspect, an image display method is provided according to an embodiment of the present disclosure, which includes: displaying a preceding image in a first display period; displaying, in a second display period, a foreground target region of a succeeding image as being superimposed on the preceding image, the succeeding image comprising a video image sequence or a single image; and displaying the succeeding image in a third display period.

In the image display method provided according to the embodiment of the present disclosure, first the preceding image is displayed, and then the foreground target of the succeeding image is displayed as being superimposed on the preceding image, and then the succeeding image is displayed, so as to realize the display transition from the preceding image to the succeeding image, thereby providing a new image transition effect. In the display period, the foreground target of the succeeding image is displayed together with the preceding image in the second display period, and then only the succeeding image is displayed in the third display period. This display method can highlight the change of people and things over time, thereby achieving better playback effects in scenes that need to reflect changes over time.

Optionally, a target image region of the succeeding image enters a display interface according to a specified first display effect, where the target image region of the succeeding image comprises a foreground target of the succeeding image or a background of the succeeding image.

In the image display method provided according to the embodiment of the present disclosure, the target image region (for example, the foreground target or the background) of the succeeding image is dynamically displayed according to the specified first display effect, so that the target image region (for example, the foreground target or the background) of the succeeding image enters the display interface according to the specified first display effect, to achieve an expected display effect, thereby improving the playback effect of spliced videos or dynamic albums.

On the basis of any of the foregoing method embodiments, after entering the display interface, the target image region of the succeeding image may be dynamically displayed according to a specified second display effect.

In the method provided by the embodiment of the present disclosure, after entering the display interface, the target image region (for example, the foreground target or the background) of the succeeding image is dynamically displayed according to the specified second display effect, to achieve an expected display effect, thereby improving the playback effect of spliced videos or dynamic albums.

On this basis, the second display effect may include, but is not limited to, at least one of a moving display effect and a zooming display effect.

In the method provided by the embodiments of the present disclosure, the target image region (for example, the foreground target or the background) of the succeeding image can dynamically change the display position and/or display size during the display process, so as to achieve an expected playback effect.

If the target image region of the succeeding image enters the display interface according to the first display effect and is dynamically displayed according to the second display effect after entering the display interface, the dynamic display mode of the target image region of the succeeding image in the second display effect is determined at least according to the first display effect of the target image region.

In the method provided by the embodiment of the present disclosure, the dynamic display mode (such as a moving path, a zooming mode) of the target image region after entering the display interface is determined according to the first display effect of the target image region entering the display interface, so that the display effects of the display processes of the same target image region entering the display interface and after entering the display interface can be connected as expected, so as to achieve an expected playback effect.

Further, if the target image region of the succeeding image includes the background of the succeeding image, the dynamic display mode of the background of the succeeding image in the second display effect is determined according to the first display effect of the background and the second display effect of the foreground target of the succeeding image.

In the method provided by the embodiment of the present disclosure, the dynamic display mode of the background of the succeeding image in the second display effect is determined according to the second display effect of the foreground target of the succeeding image, so that the movement of the background of the succeeding image after entering the display interface can fit with the movement of the foreground target, so as to achieve an expected playback effect.

In the above embodiments in which the target image region of the succeeding image is dynamically displayed according to the second display effect after entering the display interface, the dynamic display speed of the target image region of the succeeding image in the second display effect may be determined at least based on the depth of field of the target image region.

By determining the dynamic display speed after entering the display interface according to the depth of field of the target image region, the target image region can present a vivid and natural moving effect during the playback process.

On the basis of any of the above method embodiments, the background of the succeeding image is obtained by segmenting the succeeding image into a foreground region and a background region and performing image complementation on the background region.

After segmenting the succeeding image into a foreground region and a background region, the foreground region is the foreground target, and the background region obtained by the segmentation is processed by image complementation to obtain the background of the succeeding image. As a complete background image, the complemented background can be displayed in a different dynamic display mode from the foreground target during the display process, so as to provide a rich image display effect.

On the basis of any of the above method embodiments, the color of the preceding image is dynamically adjusted during the display process of the first display period, so that the color of the preceding image becomes gradually close to the color of the succeeding image.

On the basis of any of the above method embodiments, the image transparency of the preceding image is dynamically adjusted during the display process of the first display period, so that the preceding image becomes gradually transparent.

In the method provided by this embodiment of the present disclosure, by adjusting the color of the preceding image to make it become gradually close to the color of the succeeding image, and adjusting the transparency of the preceding image to make it gradually become transparency, the natural display transition from the preceding image to the succeeding image can be realized, thereby having a good playback effect.

On the basis of any of the above method embodiments, before displaying the foreground target of the succeeding image, the method provided by the embodiment of the present disclosure may include determining an image coincidence degree of a foreground target of the preceding image and a foreground target of the succeeding image in a target position relationship; and turning over, when the image coincidence degree reaches a preset image coincidence degree threshold, the foreground target of the succeeding image in a specified turning manner.

In the method provided by the embodiment of the present disclosure, when the coincidence degree of the foreground targets of the preceding image and the succeeding image in the target position relationship reaches the preset image coincidence degree threshold, the foreground target of the succeeding image is turned over, so as to reduce the coincidence degree between the two foreground targets in the target positional relationship, so that the two foreground targets are fully presented in the second display period, so as to achieve an expected playback effect.

In a second aspect, an image display method is provided according to an embodiment of the present disclosure, which includes: determining a display order of multiple to-be-displayed images; and displaying, in the display order, the multiple to-be-displayed images by the method according to any embodiment in the first aspect, where the third display period for a pair of adjacent images is the first display period for a immediately next pair of adjacent images.

In the method provided by the embodiment of the present disclosure, the display order of the multiple to-be-displayed images is determined, and the images are displayed in sequence according to the display order. Specifically, for each image pair, the preceding image is displayed first, and then the foreground target of the succeeding image is displayed as being superimposed on the preceding image, and then the succeeding image is displayed, which realizes the display transition from the preceding image to the succeeding image, providing a new image transition effect. In the second display period, the foreground target of the succeeding image is displayed together with the preceding image, and then only the succeeding image is displayed in the third display period. This display method can highlight changes in people and things over time. Therefore, the method can achieve a better playback effect for scenes that need to reflect changes over time.

On this basis, the method provided in this embodiment of the present disclosure may further includes acquiring rhythm information of a background music of the multiple to-be-displayed images, determining the first, second and third display periods for each image pair in the multiple to-be-displayed images according to the rhythm information, and playing the background music while displaying the multiple to-be-displayed images.

In the method provided by the embodiment of the present disclosure, the first display period, the second display period and the third display period for each image pair are determined according to the rhythm information of the background music of the multiple to-be-displayed images, so that the transition between the images is fitted with the rhythm of the background music, so as to achieve a better playback effect.

On the basis of any embodiment of the second aspect, the implementation manner of determining the display order of the multiple to-be-displayed images may include: determining the display order of the multiple to-be-displayed images according to a received sorting instruction and/or an image parameter of the multiple to-be-displayed images. The image parameters include at least one of: an image color and an image similarity.

In the method provided by the embodiment of the present disclosure, the display order of the images is determined according to an image parameter such as image color and an image similarity, so as to achieve an expected playback effect.

In a third aspect, an embodiment of the present disclosure provides an image display apparatus, the image display apparatus includes: a first display module configured to display a preceding image in a first display period, where the preceding image includes a video image sequence or a single image; a second display module configured to display, in a second display period, a foreground target region of a succeeding image as being superimposed on the preceding image, where the succeeding image includes a video image sequence or a single image; and a third display module configured to display the succeeding image in the third display period.

The image display apparatus provided by the embodiment of the present disclosure first displays the preceding image, and then displays the foreground target region of the succeeding image as being superimposed on the preceding image, and then displays the succeeding image, so as to realize the display transition from the preceding image to the succeeding image, providing a new image transition effect. In the second display period, the foreground target of the succeeding image is displayed together with the preceding image, and then only the succeeding image is displayed in the third display period. This display method can highlight changes in people and things over time. Therefore, the method can achieve a better playback effect for scenes that need to reflect changes over time.

Optionally, a target image region of the succeeding image enters a display interface according to a specified first display effect, where the target image region of the succeeding image comprises a foreground target of the succeeding image or a background of the succeeding image.

The apparatus provided by the embodiment of the present disclosure dynamically displays the target image region (for example, the foreground target or the background) of the succeeding image according to the specified first display effect, so that the target image region (for example, the foreground target or the background) of the succeeding image enters the display interface according to the specified first display effect, to achieve an expected display effect, thereby improving the playback effect of spliced videos or dynamic albums.

On the basis of any of the above apparatus embodiments, after entering the display interface, the target image region of the succeeding image may be dynamically displayed according to a specified second display effect.

With the apparatus provided by the embodiment of the present disclosure, the foreground target of the succeeding image can dynamically change the display position and/or display size during the display process, so as to achieve an expected playback effect.

With the apparatus provided by the embodiment of the present disclosure, after entering the display interface, the target image region (for example, the foreground target or the background) of the succeeding image is dynamically displayed according to the specified second display effect, to achieve an expected display effect, thereby improving the playback effect of spliced videos or dynamic albums.

On this basis, the second display effect may include, but is not limited to, at least one of a moving display effect and a zooming display effect.

With the apparatus provided by the embodiment of the present disclosure, the target image region (for example, the foreground target or the background) of the succeeding image can dynamically change the display position and/or display size during the display process, so as to achieve an expected playback effect.

If the target image region of the succeeding image enters the display interface according to the first display effect and is dynamically displayed according to the second display effect after entering the display interface, the dynamic display mode of the target image region of the succeeding image in the second display effect is determined at least according to the first display effect of the target image region. With the apparatus provided by the embodiment of the present disclosure, the dynamic display mode (such as a moving path, a zooming mode) of the target image region after entering the display interface is determined according to the first display effect of the target image region entering the display interface, so that the display effects of the display processes of the same target image region entering the display interface and after entering the display interface can be connected as expected, so as to achieve an expected playback effect.

Further, if the target image region of the succeeding image includes the background of the succeeding image, the dynamic display mode of the background of the succeeding image in the second display effect is determined according to the first display effect of the background and the second display effect of the foreground target of the succeeding image.

With the apparatus provided by the embodiment of the present disclosure, the dynamic display mode of the background of the succeeding image in the second display effect is determined according to the second display effect of the foreground target of the succeeding image, so that the movement of the background of the succeeding image after entering the display interface can fit with the movement of the foreground target, to achieve an expected playback effect.

In the above apparatus embodiments in which the target image region of the succeeding image is dynamically displayed according to the second display effect after entering the display interface, the dynamic display speed of the target image region of the succeeding image in the second display effect may be determined at least based on the depth of field of the target image region.

By determining the dynamic display speed after entering the display interface according to the depth of field of the target image region, the target image region can present a vivid and natural moving effect during the playback process.

On the basis of any of the above apparatus embodiments, the background of the succeeding image is obtained by segmenting the succeeding image into a foreground region and a background region and performing image complementation on the background region.

After segmenting the succeeding image into a foreground region and a background region, the foreground region is the foreground target, and the background region obtained by the segmentation is processed by image complementation to obtain the background of the succeeding image. As a complete background image, the complemented background can be displayed in a different dynamic display mode from the foreground target during the display process, so as to provide a rich image display effect.

On the basis of any of the above apparatus embodiments, the color of the preceding image is dynamically adjusted during the display process of the first display period, so that the color of the preceding image becomes gradually close to the color of the succeeding image.

On the basis of any of the above apparatus embodiments, the image transparency of the preceding image is dynamically adjusted during the display process of the first display period, so that the preceding image becomes gradually transparent.

With the apparatus provided by the embodiment of the present disclosure, by adjusting the color of the preceding image to make it become gradually close to the color of the succeeding image, and adjusting the transparency of the preceding image to make it gradually become transparency, the natural display transition from the preceding image to the succeeding image can be realized, thereby having a good playback effect.

On the basis of any of the above apparatus embodiments, before displaying the foreground target of the succeeding image, the apparatus provided by the embodiment of the present disclosure may determine an image coincidence degree of a foreground target of the preceding image and a foreground target of the succeeding image in a target position relationship; and turn over, when the image coincidence degree reaches a preset image coincidence degree threshold, the foreground target of the succeeding image in a specified turning manner.

With the apparatus provided by the embodiment of the present disclosure, when the coincidence degree of the foreground targets of the preceding image and the succeeding image in the target position relationship reaches the preset image coincidence degree threshold, the foreground target of the succeeding image is turned over, so as to reduce the coincidence degree between the two foreground targets in the target positional relationship, so that the two foreground targets are fully presented in the second display period, so as to achieve an expected playback effect.

In a fourth aspect, an image display apparatus is provided according to an embodiment of the present disclosure, which includes: a display order determination module, configured to determine a display order of multiple to-be-displayed images; and a display module, configured to display the multiple to-be-displayed images in the display order. For each pair of adjacent images in the multiple to-be-displayed images, a preceding image is displayed in a first display period corresponding to the pair of adjacent images, a foreground target region of a succeeding image is displayed as being superimposed on the preceding image in a second display period corresponding to the pair of adjacent images, the succeeding image comprises a video image sequence or a single image, the succeeding image is displayed in a third display period corresponding to the pair of adjacent image. The third display period corresponding to a pair of adjacent images is the first display period corresponding to the next pair of adjacent images.

With the apparatus provided by the embodiment of the present disclosure, the display order of the multiple to-be-displayed images is determined, and the images are displayed in sequence according to the display order. Specifically, for each image pair, the preceding image is displayed first, and then the foreground target of the succeeding image is displayed as being superimposed on the preceding image, and then the succeeding image is displayed, which realizes the display transition from the preceding image to the succeeding image, providing a new image transition effect. In the second display period, the foreground target of the succeeding image is displayed together with the preceding image, and then only the succeeding image is displayed in the third display period. This display method can highlight changes in people and things over time. Therefore, the method can achieve a better playback effect for scenes that need to reflect changes over time.

Optionally, a target image region of the succeeding image enters a display interface according to a specified first display effect, where the target image region of the succeeding image comprises a foreground target of the succeeding image or a background of the succeeding image.

With the apparatus provided by the embodiment of the present disclosure, the target image region (for example, the foreground target or the background) of the succeeding image is dynamically displayed according to the specified first display effect, so that the target image region (for example, the foreground target or the background) of the succeeding image enters the display interface according to the specified first display effect, to achieve an expected display effect, thereby improving the playback effect of spliced videos or dynamic albums.

On the basis of any apparatus embodiment of the fourth aspect, after entering the display interface, the target image region of the succeeding image may be dynamically displayed according to a specified second display effect.

With the apparatus provided by the embodiment of the present disclosure, the target image region of the succeeding image can dynamically change the display position and/or display size during the display process, so as to achieve an expected playback effect.

With the apparatus provided by the embodiment of the present disclosure, after entering the display interface, the target image region (for example, the foreground target or the background) of the succeeding image is dynamically displayed according to the specified second display effect, to achieve an expected display effect, thereby improving the playback effect of spliced videos or dynamic albums.

On this basis, the second display effect may include, but is not limited to, at least one of a moving display effect and a zooming display effect.

With the apparatus provided by the embodiment of the present disclosure, the target image region (for example, the foreground target or the background) of the succeeding image can dynamically change the display position and/or display size during the display process, so as to achieve an expected playback effect.

If the target image region of the succeeding image enters the display interface according to the first display effect and is dynamically displayed according to the second display effect after entering the display interface, the dynamic display mode of the target image region of the succeeding image in the second display effect is determined at least according to the first display effect of the target image region.

With the apparatus provided by the embodiment of the present disclosure, the dynamic display mode (such as a moving path, a zooming mode) of the target image region after entering the display interface is determined according to the first display effect of the target image region entering the display interface, so that the display effects of the display processes of the same target image region entering the display interface and after entering the display interface can be connected as expected, so as to achieve an expected playback effect.

Further, if the target image region of the succeeding image includes the background of the succeeding image, the dynamic display mode of the background of the succeeding image in the second display effect is determined according to the first display effect of the background and the second display effect of the foreground target of the succeeding image.

With the apparatus provided by the embodiment of the present disclosure, the dynamic display mode of the background of the succeeding image in the second display effect is determined according to the second display effect of the foreground target of the succeeding image, so that the movement of the background of the succeeding image after entering the display interface can fit with the movement of the foreground target, so as to achieve an expected playback effect.

In the above apparatus embodiments by which the target image region of the succeeding image is dynamically displayed according to the second display effect after entering the display interface, the dynamic display speed of the target image region of the succeeding image in the second display effect may be determined at least based on the depth of field of the target image region.

By determining the dynamic display speed after entering the display interface according to the depth of field of the target image region, the target image region can present a vivid and natural moving effect during the playback process.

On the basis of any of the above apparatus embodiments, the background of the succeeding image is obtained by segmenting the succeeding image into a foreground region and a background region and performing image complementation on the background region.

After segmenting the succeeding image into a foreground region and a background region, the foreground region is the foreground target, and the background region obtained by the segmentation is processed by image complementation to obtain the background of the succeeding image. As a complete background image, the complemented background can be displayed in a different dynamic display mode from the foreground target during the display process, so as to provide a rich image display effect.

On the basis of any of the above apparatus embodiments, the color of the preceding image is dynamically adjusted during the display process of the first display period, so that the color of the preceding image becomes gradually close to the color of the succeeding image.

On the basis of any of the above apparatus embodiments, the image transparency of the preceding image is dynamically adjusted during the display process of the first display period, so that the preceding image becomes gradually transparent.

With the apparatus provided by the embodiment of the present disclosure, by adjusting the color of the preceding image to make it become gradually close to the color of the succeeding image, and adjusting the transparency of the preceding image to make it gradually become transparency, the natural display transition from the preceding image to the succeeding image can be realized, thereby having a good playback effect On the basis of any of the above apparatus embodiments, before displaying the foreground target of the succeeding image, the apparatus provided by the embodiment of the present disclosure may determine an image coincidence degree of a foreground target of the preceding image and a foreground target of the succeeding image in a target position relationship; and turn over, when the image coincidence degree reaches a preset image coincidence degree threshold, the foreground target of the succeeding image in a specified turning manner.

With the apparatus provided by the embodiment of the present disclosure, when the coincidence degree of the foreground targets of the preceding image and the succeeding image in the target position relationship reaches the preset image coincidence degree threshold, the foreground target of the succeeding image is turned over, so as to reduce the coincidence degree between the two foreground targets in the target positional relationship, so that the two foreground targets are fully presented in the second display period, so as to achieve an expected playback effect.

On the basis of any apparatus embodiment of the fourth aspect, the apparatus provided by an embodiment of the present disclosure may further include a display time determination module, configured to acquire rhythm information of a background music of the multiple to-be-displayed images, and determine, according to the rhythm information, the first display period, the second display period and the third display period for each image pair in the multiple to-be-displayed images; and a background music playing module configured to play the background music while displaying the multiple to-be-displayed images.

With the apparatus provided by the embodiment of the present disclosure, the first display period, the second display period and the third display period for each image pair are determined according to the rhythm information of the background music of the multiple to-be-displayed images, so that the transition between the images is fitted with the rhythm of the background music, so as to achieve a better playback effect.

On the basis of any embodiment of the above fourth aspect, an implementation manner in which the display order determination module determines the display order of the multiple to-be-displayed images may include: determining the display order of the multiple to-be-displayed images according to a received sorting instruction and/or an image parameter of the multiple to-be-displayed images. The image parameters include at least one of: an image color and an image similarity.

With the apparatus provided by the embodiment of the present disclosure, the display order of the images is determined according to an image parameter such as image color and an image similarity, so as to achieve an expected playback effect.

In a fifth aspect, an electronic device is provided according to an embodiment of the present disclosure, including a processor and a memory. The memory is used to store a program for executing the methods according to the method embodiments in the first aspect and/or the second aspect. The processor is configured to execute the program stored in the memory.

The electronic device provided by the embodiment of the present disclosure first displays the preceding image, and then displays the foreground target region of the succeeding image as being superimposed on the preceding image, and then displays the succeeding image, so as to realize the display transition from the preceding image to the succeeding image, providing a new image transition effect. In the second display period, the foreground target of the succeeding image is displayed together with the preceding image, and then only the succeeding image is displayed in the third display period. This display method can highlight changes in people and things over time. Therefore, the method can achieve a better playback effect for scenes that need to reflect changes over time.

In a sixth aspect, a computer-readable storage medium is provided according to an embodiment of the present disclosure, which stores a program for executing the methods according to the method embodiments in the first aspect and/or the second aspect.

The program stored in the computer-readable storage medium provided by the embodiment of the present disclosure first displays the preceding image, and then displays the foreground target region of the succeeding image as being superimposed on the preceding image, and then displays the succeeding image, so as to realize the display transition from the preceding image to the succeeding image, providing a new image transition effect. In the second display period, the foreground target of the succeeding image is displayed together with the preceding image, and then only the succeeding image is displayed in the third display period. This display method can highlight changes in people and things over time. Therefore, the method can achieve a better playback effect for scenes that need to reflect changes over time.

DETAILED DESCRIPTION

For better understanding of the above technical solutions, the technical solutions will be described in more detail below with reference to specific embodiments and the accompanying drawings. It should be understood that the descriptions of the embodiments and the specific features in the embodiments are detailed descriptions of the technical solutions of the present disclosure, rather than limitations to the technical solutions of the present disclosure. The embodiments and the technical features can be combined with each other.

An image display method is provided according to an embodiment of the present disclosure, which is used for displaying two adjacent images. The method may be implemented by a video or image processing application program, or by corporation of the application program and a system program of an electronic device in which the application program is installed.

Figure 1:
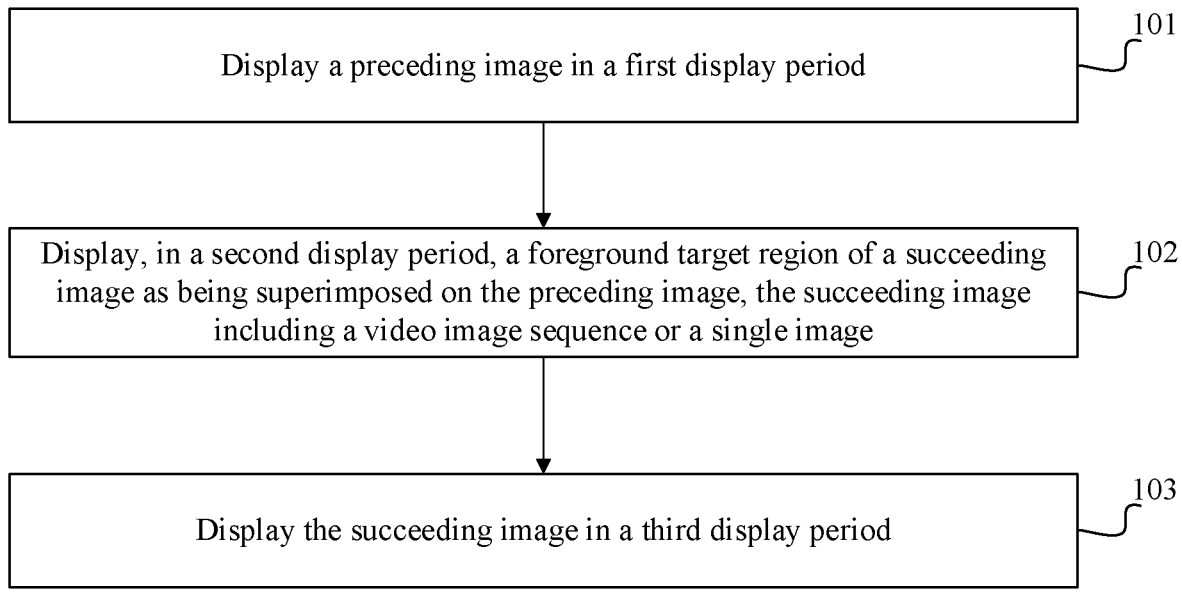
FIG. 1 is a flowchart of a method for controlling the playback of a video stream according to an embodiment of the present disclosure.

The above-mentioned two adjacent images are considered as an image pair to be displayed, the display period of which includes a first display period, a second display period and a third display period. The embodiments of the present disclosure do not limit the time length and time start point of the display period of the image pair, and do not limit the division of the first display period, second display period, and third display period, which may be determined according to product requirements in practices. As shown in FIG. 1, the method includes the following steps 101 to 103.

In step 101, a preceding image in an image pair is displayed in a first display period.

The preceding image includes a video image sequence or a single image. That is, the preceding image may be a video or an image. If the preceding image is a video, in order to save processing resources and improve processing speed, frame extraction may be performed on the video, in which case the video image sequence of the preceding image is the video image sequence obtained by frame extraction. In practices, the frame extraction may not be performed on the video, in which case the video image sequence of the preceding image is the video image sequence without being processed by frame extraction.

The displaying the video image sequence specifically includes playing the video image sequence, so as to achieve the video playback.

Figure 2A:
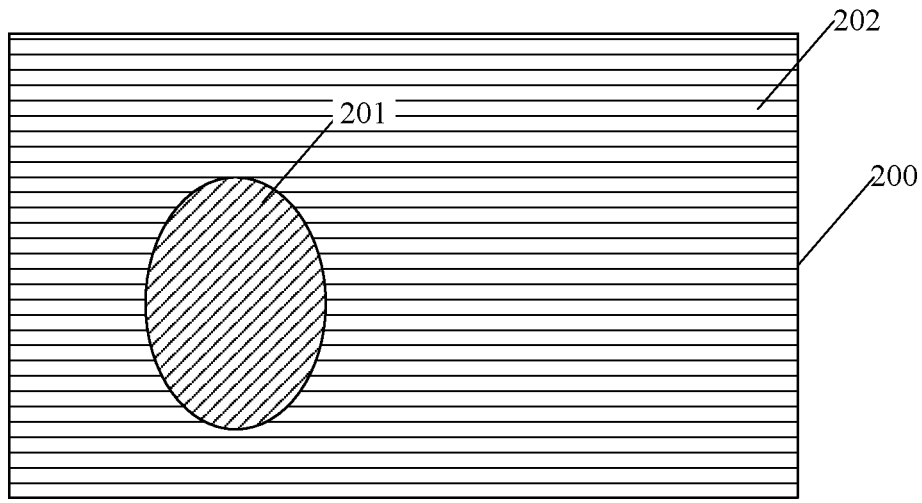
FIG. 2A is a schematic diagram of display of an image according to an embodiment of the present disclosure.

As shown in FIG. 2A, the preceding image 200 includes a foreground region 201 and a background region 202. A foreground target can be obtained by segmenting the foreground region 201 of the preceding image 200. A background can be obtained from the background region 202. In practices, the unsegmented preceding image may be displayed in the first display period, which displays the foreground target and the background of the preceding image. Alternatively, the foreground target and background obtained by the segmentation of the preceding image may be superimposed and displayed in the first display period.

In step 102, in a second display period, a foreground target region of a succeeding image is displayed as being superimposed on the preceding image.

The succeeding image includes a video image sequence or a single image. That is, the succeeding image may be a video or an image. If the succeeding image is a video, in order to save processing resources and improve the processing speed, the video can be processed by frame extraction, in which case the video image sequence of the succeeding image is the video image sequence obtained by frame extraction. In practices, the frame extraction may not be performed on the video, in which case the video image sequence of the succeeding image is the video image sequence without being processed by frame extraction.

The succeeding image includes a foreground region and a background region. A foreground target may be obtained by segmenting the foreground region of the succeeding image. The background can be obtained from the background region.

In practices, the unsegmented preceding image may be displayed in the second display period, which displays the foreground target and the background of the preceding image. Alternatively, the foreground target and background obtained by the segmentation of the preceding image may be superimposed and displayed in the second display period.

In step 103, the succeeding image is displayed in a third display period.

In practices, the unsegmented succeeding image may be displayed in the third display period, which displays the foreground target and the background of the succeeding image. Alternatively, the foreground target and background obtained by the segmentation of the preceding image may be superimposed and displayed in the third display period.

In the image display method provided according to the embodiment of the present disclosure, first the preceding image is displayed, and then the foreground target of the succeeding image is displayed as being superimposed on the preceding image, and then the succeeding image is displayed, so as to realize the display transition from the preceding image to the succeeding image, thereby providing a new image transition effect. In the display period, the foreground target of the succeeding image is displayed together with the preceding image in the second display period, and then only the succeeding image is displayed in the third display period. This display method can highlight the change of people and things over time, thereby achieving better playback effects in scenes that need to reflect changes over time.

As mentioned above, the foreground target of an image (the preceding image or succeeding image) is obtained by segmenting the foreground region of the image. For a video, an existing video foreground target extraction method can be used to perform the segmentation of the foreground region to obtain the foreground target. For a single image, an existing image foreground target extraction method can be used to perform the segmentation of the foreground region to obtain the foreground target. As an example but not a limitation, a foreground target recognition model may be pre-trained, which is then inputted with a video image sequence or a single image to obtain a foreground target.

Figure 3A:
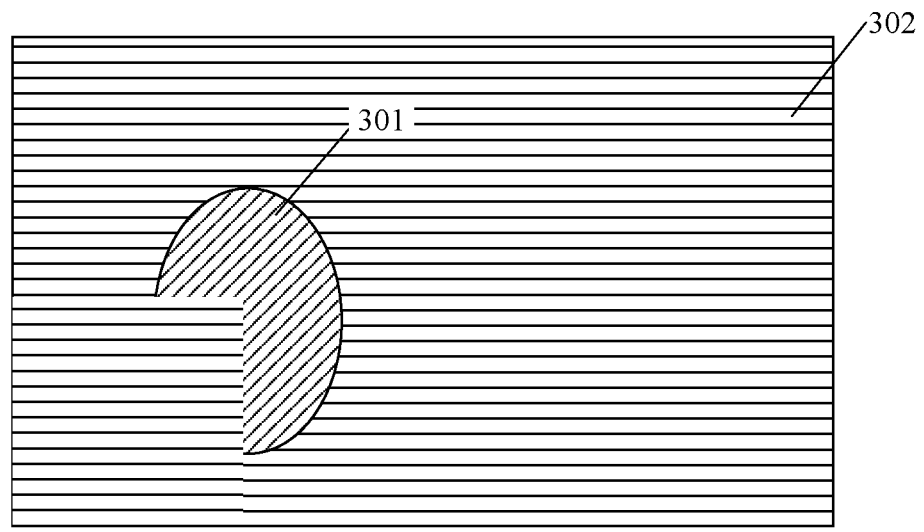
FIG. 3A is a schematic diagram of display of an image according to another embodiment of the present disclosure.
Figure 3B:
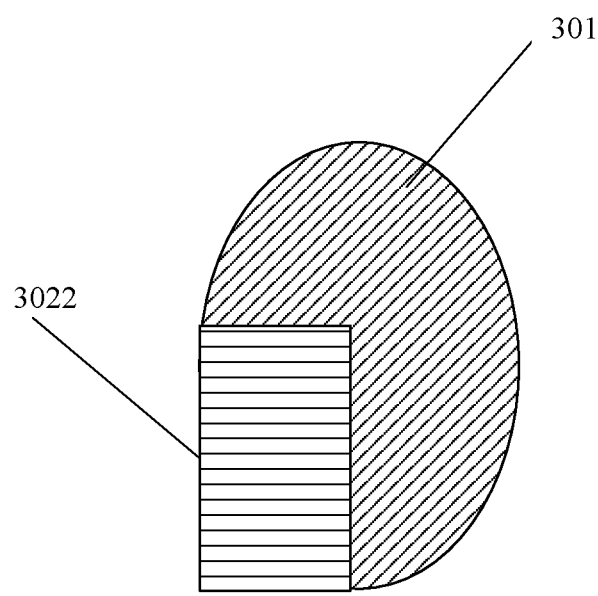
FIG. 3B is a schematic diagram of display of a foreground target obtained by segmentation according to another embodiment of the present disclosure.

In practices, a part of the foreground target may be covered by the background. For this case, a processing strategy may be determined according to product requirements, which is not limited in this embodiment of the present disclosure. In a possible implementation, an uncovered foreground region is segmented from the image as the foreground target. In another possible implementation, an uncovered foreground region is segmented from the image, and image complementation is performed on the segmented foreground region to obtain a foreground target. In another possible implementation, the uncovered foreground region and the covering background region are segmented from the image to form a foreground target, where the shape of the segmented background region is determined according to a predetermined rule. As shown in FIG. 3A, assuming that the lower left corner of the foreground region 301 is covered by the background region 302, a circumscribed rectangle of the foreground region 301 is determined according to a predetermined rule. A segmented background region is determined according to the intersection of the circumscribed rectangle and the left and lower sides of the foreground region 301, so that the foreground region 301 and the covering background region 3022 are segmented from the image to form a foreground target, as shown in FIG. 3B.

Figure 2B:
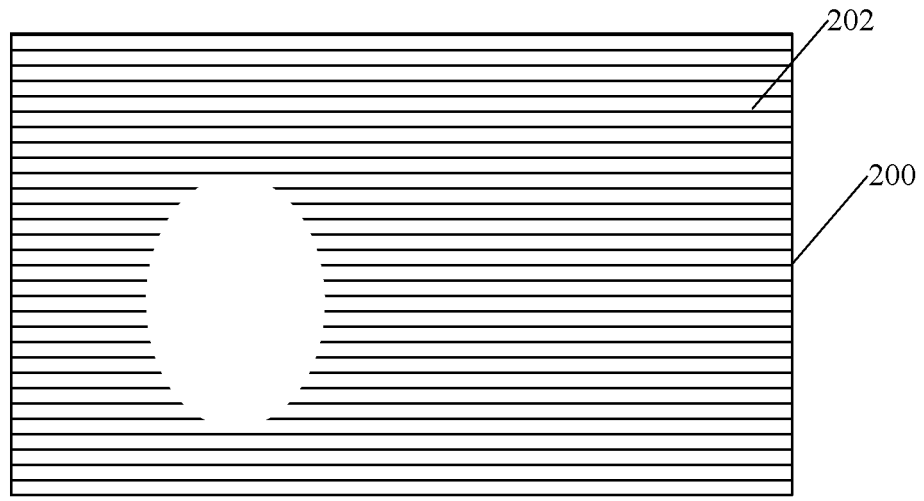
FIG. 2B is a schematic diagram of display of an underlayer background region according to an embodiment of the present disclosure.

After the foreground target is obtained by the segmentation, an existing image complementation processing may be performed on the remaining background region of the image. Still taking FIG. 2A as an example, after the foreground region 201 of FIG. 2A is segmented, the remaining background region 202 of the preceding image 200 is as shown in FIG. 2B. The blank in FIG. 2B is filled by an image complementation processing to obtain the background of the preceding image 200 (not shown in the figure). The background of the image (the preceding image or succeeding image) displayed in the above processing may be obtained by segmenting the image into the foreground region and the background region and performing image complementation on the background region.

The foreground region and the background region are obtained by segmenting the image. The foreground target is obtained based on the foreground region. The background region obtained by the segmentation is then complemented to obtain the background of the image. As a completed background image, the complemented background can be displayed in a different dynamic display mode from the foreground target, so as to provide a rich image display effect.

On the basis of any of the above method embodiments, the foreground target of the succeeding image may enter the display interface according to a specified first display effect.

On the basis of any of the above method embodiments, a target image region of the succeeding image may be dynamically displayed according to a specified second display effect after entering the display interface.

In the method provided by the embodiment of the present disclosure, the display process of the foreground target of the succeeding image is divided into a process of entering the display interface and a display process after entering the display interface. The foreground target is displayed with different display effects in these two processes. Specifically, the foreground target is displayed according to the specified first display effect, so that the foreground target of the succeeding image enters the display interface according to the specified first display effect. After the foreground target enters the display interface, the foreground target is dynamically displayed according to the specified second display effect, to achieve an expected display effect, thereby improving the playback effect of spliced videos or dynamic albums.

The first display effect is not limited in embodiments of the present disclosure, which may be determined according to product requirements in practices. As an example but not a limitation, the display effect of the foreground target entering the display interface includes: a display effect (also referred to as the fly-in effect) that the foreground target moves from a specified boundary of the display interface into the display interface, a display effect (also referred to as the burning entry effect) that different regions of the foreground target are displayed according to brightness levels at a specified position of the display interface, and a display effect (also referred to as the folded entry effect) that the foreground target is displayed as being unfolded from a folded state at a specified position of the display interface. For the fly-in effect, first foreground dynamic display parameters may include: a specified boundary (such as the upper boundary, lower boundary, left boundary, and right boundary of the display interface), a moving direction, and a moving speed. For the burning entry effect, the first foreground dynamic display parameters may include: a specified position and multiple brightness intervals. For the folded entry effect, the first foreground dynamic display parameters may include: a specified position, and a folding direction (for example, expanding from right to left, expanding from left to right, expanding from top to bottom, or expanding from bottom to top).

The second display effect is not limited in embodiments of the present disclosure, which may be determined according to product requirements in practices. As an example but not a limitation, the second display effect includes at least one of a moving display effect and a zooming display effect.

In the method provided by the embodiment of the present disclosure, the foreground target of the succeeding image can be dynamically changed in the display position and/or the display size during the display process, so as to achieve an expected playback effect.

In the method provided by this embodiment of the present disclosure, if the target image region of the succeeding image enters the display interface according to the first display effect and is dynamically displayed according to the second display effect after entering the display interface, the dynamic display mode of the target image region of the succeeding image in the second display interface is determined at least according to the first display effect of the target image region.

In practices, the dynamic display mode of the target image region in the second display effect may be determined according to the dynamic display mode and/or the dynamic display speed of the target image region in the first display effect.

In the method provided by the embodiment of the present disclosure, the dynamic display speed of the target image region of the succeeding image in the second display effect is determined at least according to a depth of field of the target image region.

If the second display effect includes a moving display effect, the corresponding dynamic display mode includes a moving path, and the corresponding dynamic display speed includes a moving speed. If the second display effect includes the zooming display effect, then the corresponding dynamic display mode includes a zooming mode (zoom in or zoom out), and the corresponding dynamic display speed includes a zooming speed.

If the second display effect includes a moving display effect, the foreground target moves in the display interface after entering the display interface, for which the moving path and moving speed need to be determined. Correspondingly, the moving path of the foreground target after entering the display interface may be determined according to the first display effect of the foreground target entering the display interface and/or the target display position of the foreground target, but is not limited thereto. Correspondingly, the moving speed of the foreground target after entering the display interface may be determined according to the depth of field of the foreground target in the succeeding image, but is not limited thereto.

The specific method for determining the moving path of the foreground target after entering the display interface is not limited in the embodiments of the present disclosure, which may be determined according to product requirements in practices. For example, the moving direction of the first display effect is used as the moving direction in the second display effect, so as to determine the moving path of the foreground target after entering the display interface. Alternatively, a direction opposite to the moving direction of the first display effect may be used as the moving direction of the second display effect, so as to determine the moving path of the foreground target after entering the display interface. For another example, the display position of the foreground target at the end of the first display effect is taken as the starting position of the moving path after entering the display interface, and the target display position is taken as the ending position of the moving path after entering the display interface. The straight line segment between the two positions is used as the moving path after entering the display interface.

The specific method for determining the moving speed of the foreground target after entering the display interface is not limited in the embodiments of the present disclosure, which may be determined according to product requirements in practices. For example, a functional relationship between the depth of field of an image and the moving speed of the image is established in advance, and the moving speed of the foreground target after entering the display interface is determined according to the functional relationship and the depth of field of the foreground target. The depth of field of the foreground target can be determined by using an existing method.

In the method provided by the embodiment of the present disclosure, the moving path of the foreground target after entering the display interface is determined according to the first display effect, so that the display effect of the display process of the foreground target entering the display interface and the display effect of the display process after entering the display interface can be connected as expected, so as to produce an expected playback effect. By determining the moving path after entering the display interface according to the target display position of the foreground target of the succeeding image, the foreground target can gradually approach to the target position, so as to achieve an expected playback effect. By determining the moving speed of the foreground target after entering the display interface according to the depth of field of the foreground target, the foreground target can present a vivid and natural moving effect during the playback process.

If the second display effect includes a zooming display effect, it is necessary to determine the zooming mode (zoom in or zoom out) and/or the zooming speed of the foreground target after entering the display interface. Correspondingly, the zooming mode of the foreground target after entering the display interface may be determined according to the first display effect, and the zooming speed of the foreground target after entering the display interface may be determined according to the depth of field of the foreground target in the succeeding images.

The specific method for determining the zooming mode of the foreground target after entering the display interface is not limited in the embodiments of the present disclosure, which may be determined according to product requirements in practices. As an example but not a limitation, in a possible implementation, the zooming mode and zooming speed in the first display effect are used as the zooming mode and zooming speed in the second display effect, so as to achieve a continuous change effect. In another possible implementation, the zooming speed in the first display effect is used as the zooming speed in the second display effect, and the zooming mode in the second display effect is set to be opposite to the zooming mode in the first display effect, so as to achieve a contrast effect.

The specific method for determining the zooming speed of the foreground target after entering the display interface is not limited in the embodiments of the present disclosure, which may be determined according to product requirements in practices. For example, a functional relationship between the depth of field of an image and the image zooming speed is established in advance, and the zooming speed of the foreground target after entering the display interface is determined according to the functional relationship and the depth of field of the foreground target.

In the method provided by this embodiment of the present disclosure, the zooming mode of the foreground target after entering the display interface is determined according to the first display effect, so that the display effect of the display process of the foreground target entering the display interface and the display effect of the display process after entering the display interface can be connected as expected, so as to achieve an expected playback effect. The zooming speed of the foreground target after entering the display interface is determined according to the depth of field of the foreground target, so that the foreground target can present a vivid and natural change effect during the playback process.

On the basis of any of the above method embodiments, the display process of the background of the succeeding image includes a display process of entering the display interface and a display process after entering the display interface, and the two display processes are performed in the third display period. Correspondingly, the background of the succeeding image enters the display interface according to a specified first display effect. Further, after entering the display interface, the background of the succeeding image is dynamically displayed according to a second display effect.

It should be noted that the first display effect of the foreground target of the succeeding image and the first display effect of the background of the succeeding image may be the same display effect, or may be different display effects. The second display effect of the foreground target of the succeeding image and the second display effect of the background of the succeeding image may be the same display effect, or may be different display effects.

The first display effect of the background of the succeeding image entering the display interface is not limited in embodiments of the present disclosure, which may be determined according to product requirements in practices. As an example but not a limitation, the display effect of the background entering the display interface includes: a display effect (also referred to as the fly-in effect) that the background moves from a specified boundary of the display interface into the display interface, a display effect (also referred to as the burning entry effect) that different regions of the background are displayed according to brightness levels at a specified position of the display interface, and a display effect (also referred to as the folded entry effect) that the background is displayed as being unfolded from a folded state at a specified position of the display interface. For the fly-in effect, first background dynamic display parameters may include: a specified boundary (such as the upper boundary, lower boundary, left boundary, and right boundary of the display interface), a moving direction, and a moving speed. For the burning entry effect, the first background dynamic display parameters may include: a specified position and multiple brightness intervals. For the folded entry effect, the first background dynamic display parameters may include: a specified position, and a folding direction (for example, expanding from right to left, expanding from left to right, expanding from top to bottom, or expanding from bottom to top).

The second display effect of the background of the succeeding image after entering the display interface is not limited in embodiments of the present disclosure, which may be determined according to product requirements in practices. As an example but not a limitation, the second display effect of the background of the succeeding image after entering the display interface includes at least one of a moving display effect and a zooming display effect.

In the method provided by the embodiment of the present disclosure, the background of the succeeding image can be dynamically changed in the display position and/or the display size during the display process, so as to achieve an expected playback effect.

the specific determination methods of the moving path, moving speed, zooming mode, and zooming speed of the background after entering the display interface are not limited in the embodiments of the present disclosure, which may be determined according to product requirements in practices. For possible implementations, reference may be made to the above description of the moving display effect of the foreground target after entering the display interface, which will not be repeated here.

In practices, in addition to determining the moving path of the background after entering the display interface with reference to the implementations of the moving display effect of the foreground target after entering the display interface, the moving path of the background of the succeeding image after entering the display interface can also be determined according to the moving path of the foreground target of the succeeding image after entering the display interface.

In practices, in addition to determining the zooming mode of the background after entering the display interface with reference to the implementation of the moving display effect of the foreground target after entering the display interface, the zooming mode of the background of the succeeding image after entering the display interface can also be determined according to the zooming mode of the foreground target of the succeeding image after entering the display interface.

On the basis of any of the above method embodiments, displaying the preceding image in the image pair in the first display period may specifically include: dynamically adjusting a color of the foreground target of the preceding image and/or a color of the background image of the preceding image, so that the color of the foreground target of the preceding image and/or the color of the background of the preceding image become gradually close to the color of the succeeding image.

When displaying the preceding image, only the color of the preceding image needs to be adjusted. When displaying the superimposed foreground target and background of the preceding image, the colors of the foreground target and the background are adjusted respectively.

In practices, the colors of the foreground image, foreground target, and the background may be determined according to product requirements. Taking the foreground image as an example, the average value of the colors of the pixels of the foreground image may be used as the color of the foreground image.

On the basis of any of the above method embodiments, displaying the preceding image in the image pair in the first display period may specifically include: dynamically adjusting a transparency of the foreground target of the preceding image and/or a transparency of the background of the preceding image, so that the foreground target and/or background of the preceding image become gradually transparent.

In the method provided by this embodiment of the present disclosure, by adjusting the color of the preceding image to make it become gradually close to the color of the succeeding image, and adjusting the transparency of the preceding image to make it become gradually transparent, the natural transition from the preceding image to the succeeding image can be realized, so as to achieve a good playback effect.

On the basis of any of the above method embodiments, before displaying the foreground target of the succeeding image, the method provided by the embodiment of the present disclosure may further include determining an image coincidence degree of a foreground target of the preceding image and a foreground target of the succeeding image in a target position relationship; and turning over, when the image coincidence degree reaches a preset image coincidence degree threshold, the foreground target of the succeeding image in a specified turning manner.

In practices, the target position relationship is defined according to product requirements. As an example but not a limitation, a possible target position relationship is that the preceding image is aligned with the succeeding image (center alignment, border alignment or corner alignment). Another possible target position relationship is the positional relationship between the foreground target of the preceding image and the foreground target of the succeeding image at the end of the above-mentioned second foreground display sub-process.

In practices, the image coincidence degree is defined according to product requirements. For example, the image coincidence degree may be defined as the ratio of the area of the overlapping region of the two foreground targets to the area of the image region of the smaller one of the two foreground targets.

In the method provided by the embodiment of the present disclosure, when the coincidence degree of the foreground targets of the preceding image and the succeeding image in the target position relationship reaches the preset image coincidence degree threshold, the foreground target of the succeeding image is turned over, so as to reduce coincidence degree between the two foreground targets in the target positional relationship, so that the two foreground targets are fully presented in the second display period, so as to achieve an expected playback effect.

Another image display method for displaying multiple images is provided according to an embodiment of the present disclosure. The method may be implemented by a video or image processing application program, or by corporation of the application program and a system of an electronic device in which the application program is installed. The method includes the following operations: determining a display order of multiple to-be-displayed images; where every two adjacent images in the multiple to-be-displayed images constitute an image pair; and sequentially displaying the multiple to-be-displayed images according to the methods described in the above embodiments, where the third display period of an image pair is the first display period of the next image pair.

In the method provided by the embodiment of the present disclosure, the display order of the multiple to-be-displayed images is determined, and the images are displayed in sequence according to the display order. Specifically, for each image pair, the preceding image is displayed first, and then the foreground target of the succeeding image is displayed as being superimposed on the preceding image, and then the succeeding image is displayed, which realizes the display transition from the preceding image to the succeeding image, providing a new image transition effect. In the second display period, the foreground target of the succeeding image is displayed together with the preceding image, and then only the succeeding image is displayed in the third display period. This display method can highlight changes in people and things over time. Therefore, the method can achieve a better playback effect for scenes that need to reflect changes over time.

The embodiments of the present disclosure do not limit the time length and time start point of the display period of each image pair in the to-be-displayed images, and do not limit the division of the above-mentioned first display period, second display period, and third display period for each image pair, which are determined according to production requirements in practices. As an example but not a limitation, in a possible implementation, rhythm information of the background music of the multiple to-be-displayed images is acquired, and the first, second and third display periods for each image pair in the multiple to-be-displayed images are determined according to the rhythm information, and the background music is played while displaying the multiple to-be-displayed images.

The rhythm information includes beat time point information, which is obtained by processing the background music by a beat detection algorithm.

The embodiment of the present disclosure does not limit the implementation of division using the rhythm information to obtain the display period of each image pair and obtain the first display period, the second display period, and the third display period for each image pair. A division strategy may be predetermined according to product requirements.

In the method provided by the embodiment of the present disclosure, the first display period, the second display period and the third display period for each image pair are determined according to the rhythm information of the background music of the multiple to-be-displayed images, so that the transition between the images is fitted with the rhythm of the background music, so as to achieve a better playback effect.

This embodiment of the present disclosure does not limit the method of determining the display order of the multiple to-be-displayed images. In a possible implementation, the display order is determined according to a received sorting instruction, which may be input by a user. Specifically the display order is determined according to an order in which the user selects images, which may be obtained through a communication interface. In another possible implementation, the display order of the multiple to-be-displayed images is determined according to an image parameter of the multiple to-be-displayed images, where the image parameter includes at least one of an image color and an image similarity. In an example but not a limitation, the colors of the images may be quantized, and the images may be sorted according to the quantized image colors. Alternatively, the similarity of each pair of images are calculated, and the images are sorted according to a predetermined strategy based on the similarities.

In the method provided by the embodiment of the present disclosure, the display order of the images is determined according to an image parameter such as image color and an image similarity, so as to achieve an expected playback effect.

The image display methods provided in the embodiments of the present disclosure are applicable to mobile terminals installed with the above application programs, such as smart phones, tablet computers, in-vehicle computers, and smart speakers, and are also applicable to personal computers installed with the above application programs.

The image display method provided by the embodiments of the present disclosure will be described below with reference to a specific application scenario.

In this specific application scenario, an application A is installed on a mobile terminal used by a user. The application A may include a service module, an algorithm module, a VE (video engine) SDK (software development kit), and an effect SDK. Application A is started in response to a trigger by the user. Then the user triggers a dynamic photo album making function in application A, so that the service module of the application A displays a first human-computer interaction interface on the display screen of the mobile terminal. The user selects a dynamic album template B through the first human-computer interaction interface and selects 10 photos from the photos stored on the mobile terminal.

Figure 4:
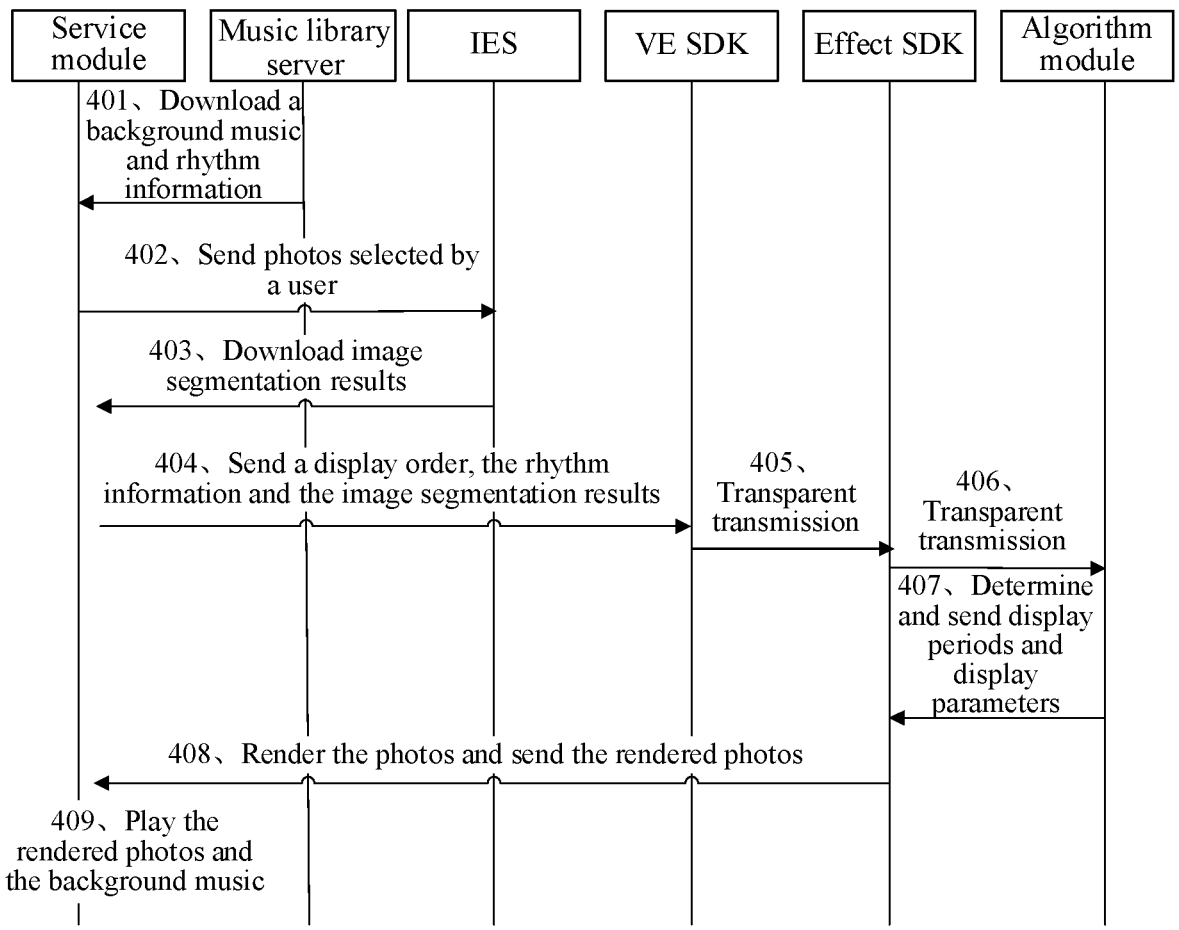
FIG. 4 is a flowchart of an image display method according to an embodiment of the present disclosure.

FIG. 4 shows the process of creating and playing a dynamic photo album by application A, which includes the following step 401 to 409.

In step 401, the business module of the application A downloads the background music corresponding to the dynamic album template B and the rhythm information of the background music, from a music library server.

It should be noted that the music library server, the IES (Internet Event Server), or the like in this embodiment are servers defined logically in view of functions. In practices, the music library server and IES may be implemented as separated servers, or implemented as one server. For example, the functions of the music library server and the IES are implemented by a same server.

It should be noted that, in practices, the service module may acquire the background music from the mobile terminal.

It should be noted that, in practices, the service module may obtain the rhythm information of the background music from the mobile terminal. Alternatively, the rhythm information of the background music may be determined by the algorithm module or the VE SDK. The specific method of determining the rhythm information by the algorithm module is not limited in this embodiment, which may be performed by an existing method in practices.

In step 402, the service module of the application A sends the 10 photos selected by the user to the IES server, and requests the IES server to segment the 10 photos.

In practices, the photos to be segmented may be determined according to a specific display strategy of the dynamic album template B, and then sent to the IES server. For example, if the first photo in the dynamic album is not required to be segmented, the service side sends only the second to tenth photos after determining the order of the 10 photos.

In practices, the photo may alternatively be segmented by the algorithm module.

In step 403, the service module of the application obtains the image segmentation results of the above 10 photos from the IES server.

The image segmentation result of each photo includes the foreground target and background of the photo. Optionally, the image segmentation result also includes the depth of field of the foreground target and the depth of field of the background, the center of the foreground target, the frame size of the foreground target, and the color of the foreground target, the color of the photo, or the like.

The color of the image may be determined by a clustering algorithm.

The background of the photo is obtained by performing image complementation on the background region of the segmented photo.

In step 404, the business module of the application determines the display order of the above 10 photos, and sends the display order of the photos, the above rhythm information and the image segmentation results to the VE SDK of the application.

In this embodiment, the service module first sorts the above 10 photos according to the order of the photos selected by the user, and then processes the photo sequence according to a predetermined window length (for example, 4 photos) and a window sliding step size (for example, 1 photo), to determine the display order of the 10 photos. In each window, the image color similarities between the respective last three photos in the window and the first photo in the window are calculated, and the photo having the highest image color similarity with the first photo is placed to the position of the second photo in the window, and the other photos are moved backwards. In practices, the similarity of images can also be calculated from another properity.

In step 405, the VE SDK transparently transmits the display order of the photos, the image segmentation results and the rhythm information of the background music to the effect SDK.

The VE SDK determines whether the rhythm information is received. If the rhythm information is not received, The VE SDK determines the rhythm information of the background music.

In step 406, the effect SDK transparently transmits the display order of the photos, the image segmentation results and the rhythm information of the background music to the algorithm module.

In step 407, the algorithm module determines the first display period, the second display period and the third display period of each image pair in the above 10 photos according to the rhythm information, and determines display parameters of the preceding image and the succeeding image in each image pair, and send the determined information to the effect SDK.

Specifically, for the first image pair, the algorithm module determines the display parameters of the preceding image in the first display period and the second display period, which includes the image moving path (a moving path from a position that the center of the photo is aligned with the center of the display interface to a position that the center of the foreground target is aligned with the center of the display interface), the moving speed of the preceding image (which is determined according to the depth of field of the foreground target of the preceding image, a great depth of field leading to a high moving speed), the zooming mode of the preceding image (from large to small), the zooming speed of the preceding image (which is determined according to the depth of field of the foreground target of the preceding image, a great depth of field leading to a high zooming speed), the way of changing the image color of the preceding image (becoming gradually close to the color of the succeeding image), the way of changing the transparency of the preceding image (becoming gradually transparent). The algorithm module randomly selects the display effect of the foreground target of the succeeding image entering the display interface in the first foreground display sub-process, and determines the first foreground dynamic display parameter corresponding to the display effect. For the fly-in effect, the first foreground dynamic display parameter includes an entering boundary (i.e., the entering direction, which may be determined according to a position of the center of the foreground target of the succeeding image when the succeeding image is displayed in the center of the display interface). For the folded entry effect, the first foreground dynamic display parameter includes a folding manner (which may be determined randomly). For the burning entry effect, the first foreground dynamic display parameter includes multiple brightness intervals (where the brightest part of the foreground target is displayed first and the darkest part of the foreground target is displayed last). The algorithm module determines the second foreground dynamic display parameter of the foreground target of the succeeding image in the second foreground display sub-process. The second foreground dynamic display parameter may include a transparency adjustment mode and an adjustment speed (for example, the foreground target is gradually opaque during the second display period, and is gradually transparent during the third display period), a color adjustment mode and an adjustment speed (for example, the color of the foreground target becomes gradually close to the color of the next photo during the third display period), a moving path, a moving speed, a zooming mode, a zooming speed, or the like. The algorithm module randomly selects the display effect of the background of the succeeding image entering the display interface in the first background display sub-process, and determines the first background dynamic display parameter corresponding to the display effect. For specific implementations, reference may be made to the foregoing description, which will not be repeated here. The algorithm module determines the second background dynamic display parameter of the background of the succeeding image in the second background display sub-process. For specific implementations, reference may be made to the foregoing description, which will not be repeated here.

For other image pairs after the first image pair, since the preceding image in the image pair is the succeeding image in the preceding image pair, the relevant display parameters for the preceding image need not to be determined, and only the relevant display parameters for the succeeding images needs to be determined according to the above processing.

In step 408, the effect SDK sequentially renders each photo according to the information determined by the algorithm module to realize the above display effects, and sends the rendered photos to the service module.

In step 409, the service module sequentially plays the rendered photos according to the display order to present the above display effects, and plays the background music.

Figure 5:
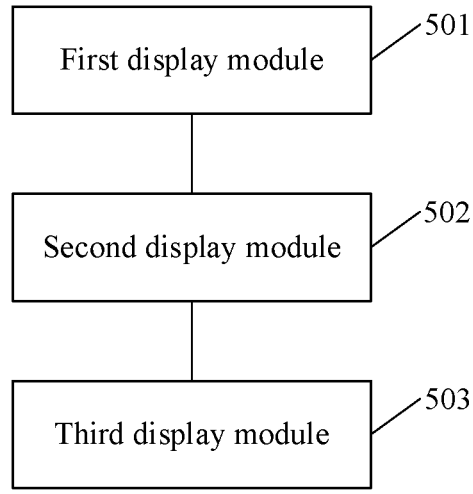
FIG. 5 is a block diagram of an image display apparatus according to an embodiment of the present disclosure.

Based on the same inventive concept as the method, an image display device is provided according to an embodiment of the present disclosure. As shown in FIG. 5, the device includes the following modules 501 to 502.

A first display module 501 is configured to display a preceding image in a first display period.

A second display module 502 is configured to display, in a second display period, a foreground target region of a succeeding image as being superimposed on the preceding image, where the succeeding image includes a video image sequence or a single image.

A third display module 503 is configured to display the succeeding image in a third display period.

The image display apparatus provided by the embodiment of the present disclosure first displays the preceding image, and then displays the foreground target region of the succeeding image as being superimposed on the preceding image, and then displays the succeeding image, so as to realize the display transition from the preceding image to the succeeding image, providing a new image transition effect. In the second display period, the foreground target of the succeeding image is displayed together with the preceding image, and then only the succeeding image is displayed in the third display period. This display method can highlight changes in people and things over time. Therefore, the method can achieve a better playback effect for scenes that need to reflect changes over time.

For specific implementations of the apparatus, reference may be made to the foregoing method embodiments, which will not be repeated here.

Figure 6:
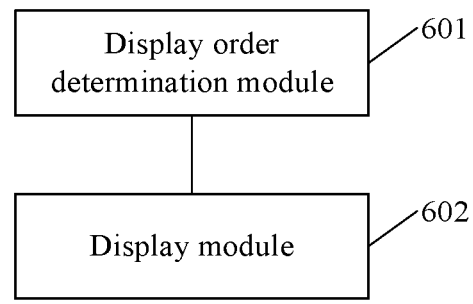
FIG. 6 is a block diagram of an image display apparatus according to another embodiment of the present disclosure.

Based on the same inventive concept as the method, another image display apparatus is provided according to an embodiment of the present disclosure. As shown in FIG. 6, the image display apparatus includes the following modules 601 and 602.

A display order determination module 601 is configured to determine a display order of multiple to-be-displayed images.

A display module 602 is configured to display the multiple to-be-displayed images in the display order. For each pair of adjacent images, a preceding image is displayed in a first display period corresponding to the pair of adjacent images, a foreground target region of a succeeding image is displayed as being superimposed on the preceding image in a second display period corresponding to the pair of adjacent images, the succeeding image including a video image sequence or a single image, the succeeding image is displayed in a third display period corresponding to the pair of adjacent image. The third display period corresponding to a pair of adjacent images is the first display period corresponding to the next pair of adjacent images.

The image display apparatus provided by the embodiment of the present disclosure first determines a display order of multiple to-be-displayed images, and then displays the multiple to-be-displayed images in the display order. Specifically, for each pair of adjacent images, the preceding image is displayed first, and then the foreground target of the succeeding image is displayed as being superimposed on the preceding image, and then the succeeding image is displayed, which realizes the display transition from the preceding image to the succeeding image, providing a new image transition effect. In the second display period, the foreground target of the succeeding image is displayed together with the preceding image, and then only the succeeding image is displayed in the third display period. This display method can highlight changes in people and things over time. Therefore, the method can achieve a better playback effect for scenes that need to reflect changes over time.

For specific implementations, reference may be made to the descriptions of the foregoing method embodiments, which will not be repeated here.

On the basis of any of the above apparatus embodiments as shown FIG. 6, the apparatus provided by an embodiment of the present disclosure may further include a display time determination module, configured to acquire rhythm information of a background music of the multiple to-be-displayed images, and determine, according to the rhythm information, the first display period, the second display period and the third display period for each image pair in the multiple to-be-displayed images; and a background music playing module configured to play the background music while displaying the multiple to-be-displayed images.

The device provided by the embodiment of the present disclosure determines the first display period, the second display period and the third display period of each image pair according to the rhythm information of the background music of the multiple to-be-displayed images, so that the transition between the images is fitted with the rhythm of the background music, so as to achieve a better playback effect.

On the basis of the above apparatus embodiment as shown in FIG. 6, the display order determination module may determine the display order of the multiple to-be-displayed images according to a received sorting instruction and/or an image parameter of the multiple to-be-displayed images. The image parameter includes at least one of an image color and an image similarity.

With the apparatus provided by the embodiment of the present disclosure, the display order of the images is determined according to an image parameter such as an image color and an image similarity, so as to achieve an expected playback effect.

Based on the same inventive concept as the method, an electronic device is provided according to an embodiment of the present disclosure. The electronic device includes a processor and a memory.

The memory is used to store programs for executing the methods described in the above method embodiments. the processor is configured to execute the programs stored in the memory. The processor may be a central processing unit (CPU) or a processing unit including in other form having data processing capabilities and/or instruction execution capabilities, and can control other components in an electronic device to perform desired functions. The memory may include one or more computer program products, which may include various forms of computer-readable storage media, such as volatile memory and/or non-volatile memory. The volatile memory may include, for example, a random access memory (RAM) and/or a cache memory, or the like. The non-volatile memory may include, for example, a read only memory (ROM), a hard disk, a flash memory, and the like. One or more computer program instructions may be stored on the computer-readable storage medium, which may be executed by a processor to implement the functions of the embodiments of the present disclosure described above and/or other desired functions.

The electronic device provided by the embodiment of the present disclosure first displays a preceding image of a image pair, and then displays a foreground of a succeeding image of the image pair as being superimposed on the preceding image, and then displays the succeeding image, so as to realize the display transition from the preceding image to the succeeding image, providing a new image transition effect. In the second display period, the foreground target of the succeeding image is displayed together with the preceding image, and then only the succeeding image is displayed in the third display period. This display method can highlight changes in people and things over time. Therefore, the method can achieve a better playback effect for scenes that need to reflect changes over time.

Figure 7:
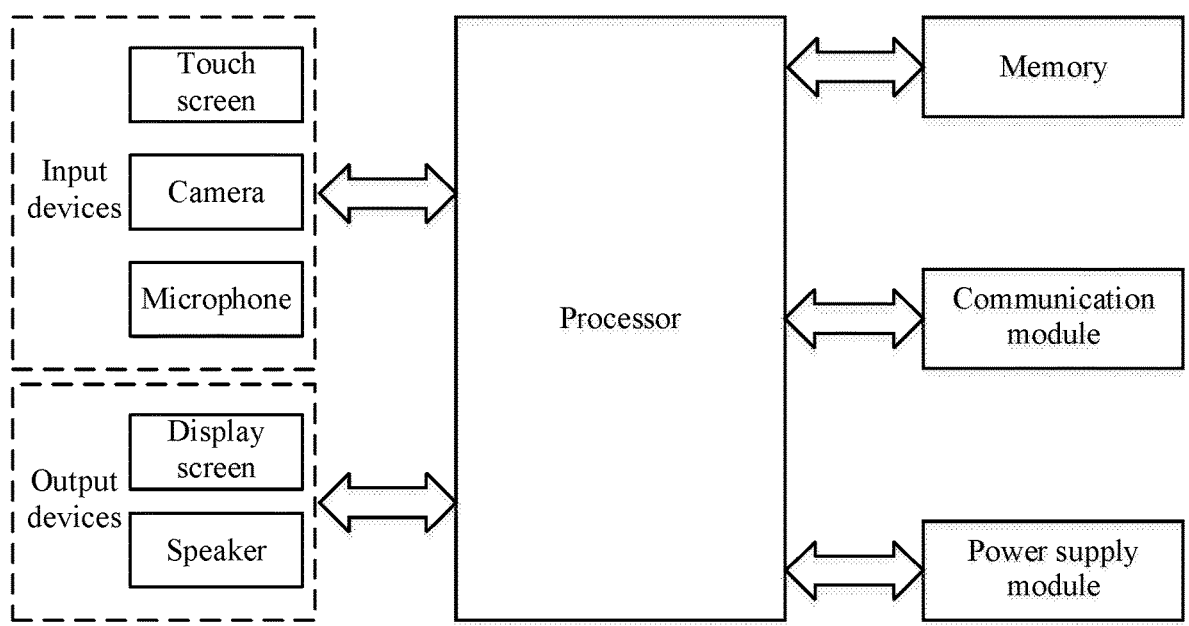
FIG. 7 is a schematic structural diagram of an electronic device according to an embodiment of the present disclosure.

The electronic device provided by the embodiments of the present disclosure may include a smart phone, a handheld computer, a tablet computer, a vehicle-mounted computer or a smart speaker which is installed with the above display screen or play videos or dynamic albums through the display screen. As shown in FIG. 7, the electronic devices include not only a processor and a memory, but also an input device (such as a touch screen, a camera, and a microphone), an output device (such as a display screen, and a speaker), a communication module, and a power supply module.

The memory, the input device, the output device, the communication module, and the power supply module are connected to the processor through a serial port, a bus or a USB interface.

The memory of the mobile terminal may include, but is not limited to, a flash memory, a RAM (random access memory), a ROM (read only memory), and the like. The RAM is mainly used to store programs and data when the mobile terminal is running. The programs to be executed or the data to be processed should be loaded into the RAM first. The ROM is mainly used to check the configuration of the mobile terminal operating system and provide the basic input and output (I/O) programs. The flash memory is a kind of long-life non-volatile memory (which can still retain stored data information in the event of a power failure), in which data deletion is not based on a single byte, but based on a fixed block. Since the flash memory can still store data when the power is turned off, it is usually used to store the setting information, such as the setting information of the mobile phone by a user.

It should be noted that for different electronic devices, more or less hardware structures than the mobile terminal shown in FIG. 7 may be included. All electronic devices fall within the scope of the present disclosure, as long as a memory and a processor are included and can implement the functions of the above method embodiments.

Based on the same inventive concept as the method, a computer-readable storage medium is provided according to an embodiment of the present disclosure, which stores a program for executing the methods described in the foregoing embodiments.

The program stored in the computer-readable storage medium provided by the embodiment of the present disclosure first displays a preceding image of a image pair, and then displays a foreground of a succeeding image of the image pair as being superimposed on the preceding image, and then displays the succeeding image, so as to realize the display transition from the preceding image to the succeeding image, providing a new image transition effect. In the second display period, the foreground target of the succeeding image is displayed together with the preceding image, and then only the succeeding image is displayed in the third display period. This display method can highlight changes in people and things over time. Therefore, the method can achieve a better playback effect for scenes that need to reflect changes over time.

The description is made with reference to flowchart and/or block diagrams of methods, apparatus (systems), and computer program products according to the embodiments. It will be understood that each flow and/or block in the flowcharts and/or block diagrams, and combinations of flows and/or blocks in the flowcharts and/or block diagrams, can be implemented by computer program instructions. These computer program instructions may be provided to the processor of a general purpose computer, special purpose computer, embedded processor or other programmable data processing device to produce a machine such that the instructions executed by the processor of the computer or other programmable data processing device produce a device that implements the functions specified in a flow or flows of a flowchart and/or a block or blocks of a block diagram.

These computer program instructions may also be stored in a computer readable memory capable of directing a computer or other programmable data processing apparatus to function in a particular manner, such that the instructions stored in the computer readable memory result in an article of manufacture comprising the instruction apparatus. The instructions apparatus implements the functions specified in the flow or flows of the flowcharts and/or the block or blocks of the block diagrams.

These computer program instructions can also be loaded on a computer or other programmable data processing device to cause a series of operational steps to be performed on the computer or other programmable device to produce a computer-implemented process such that the instructions provide steps for implementing the functions specified in one or more of the flowcharts and/or one or more blocks of the block diagrams.

While the preferred embodiments of this specification have been described, other changes and modifications to these embodiments may occur to those skilled in the art after knowing the basic inventive concepts. Therefore, the appended claims are intended to be construed to include the preferred embodiment and all changes and modifications that fall within the scope of this specification.

Apparently, those skilled in the art can make various changes and modifications to this specification without departing from the spirit and scope of this specification. Thus, provided that these modifications and variations of the present specification fall within the scope of the claims of the present specification and their technical equivalents, the present specification is also intended to include these modifications and variations.

The invention claimed is:
1. An image display method, comprising:
 displaying a preceding image in a first display period, the preceding image comprising a video image sequence or a single image;
 displaying, in a second display period, a foreground target region of a succeeding image as being superimposed on the preceding image, the succeeding image comprising a video image sequence or a single image; and
 displaying the succeeding image in a third display period, wherein a target image region of the succeeding image enters a display interface according to a specified first display effect, and the target image region of the succeeding image comprises a foreground target of the succeeding image or a background of the succeeding image.

2. The method according to claim 1, wherein the target image region of the succeeding image is dynamically displayed according to a specified second display effect after entering the display interface, the target image region comprises a foreground target of the succeeding image or a background of the succeeding image.

3. The method according to claim 2, wherein the second display effect comprises at least one of: a moving display effect and a zooming display effect.

4. The method according to claim 2, wherein in a case that the target image region of the succeeding image enters the display interface according to the first display effect and is dynamically displayed according to the specified second display effect after entering the display interface, a dynamic display mode of the target image region of the succeeding image in the second display effect is determined at least according to the first display effect of the target image region.

5. The method according to claim 4, wherein in a case that the target image region of the succeeding image comprises the background of the succeeding image, a dynamic display mode of the background of the succeeding image in the second display effect is determined according to the first display effect of the background and the second display effect of the foreground target of the succeeding image.

6. The method according to claim 2, wherein a dynamic display speed of the target image region of the succeeding image in the second display effect is determined at least according to a depth of field of the target image region.

7. The method according to claim 1, wherein a background of the succeeding image is obtained by segmenting the succeeding image into a foreground region and a background region and performing image complementation on the background region.

8. The method according to claim 1, wherein before displaying a foreground target of the succeeding image, the method further comprises:
determining an image coincidence degree of a foreground target of the preceding image and a foreground target of the succeeding image in a target position relationship; and
turning over, when the image coincidence degree reaches a preset image coincidence degree threshold, the foreground target of the succeeding image in a specified turning manner.

9. A non-transitory computer-readable storage medium, storing a program for executing the method according to claim 1.

10. An image display method, comprising:
determining a display order of a plurality of to-be-displayed images; and
displaying, in the display order, the plurality of to-be-displayed images by the method according to claim 1, wherein the third display period for a pair of adjacent images is the first display period for an immediately next pair of adjacent images.

11. The method according to claim 10, wherein the determining a display order of a plurality of to-be-displayed images comprises:
determining the display order of the plurality of to-be-displayed images according to a received sorting instruction and/or an image parameter of the plurality of to-be-displayed images, wherein the image parameter comprises at least one of: an image color and an image similarity.

12. A non-transitory computer-readable storage medium, storing a program for executing the method according to claim 10.

13. An image display device, comprising:
one or more processors; and
a memory configured to store one or more programs;
wherein when the one or more programs are executed by the one or more processors, the one or more processors are caused to perform operations comprising:
displaying a preceding image in a first display period, the preceding image comprising a video image sequence or a single image;
displaying, in a second display period, a foreground target region of a succeeding image as being superimposed on the preceding image, the succeeding image comprising a video image sequence or a single image; and
displaying the succeeding image in a third display period, wherein a target image region of the succeeding image enters a display interface according to a specified first display effect, and the target image region of the succeeding image comprises a foreground target of the succeeding image or a background of the succeeding image.

14. The image display device of claim 13, wherein the target image region of the succeeding image is dynamically displayed according to a specified second display effect after entering the display interface, the target image region comprises a foreground target of the succeeding image or a background of the succeeding image.

15. The image display device of claim 14, wherein the specified second display effect comprises at least one of a moving display effect or a zooming display effect.

16. The image display device of claim 14, wherein when the target image region of the succeeding image enters the display interface according to the first display effect and is dynamically displayed according to the specified second display effect after entering the display interface, a dynamic display mode of the target image region of the succeeding image in the second display effect is determined at least according to the first display effect of the target image region.

17. The image display device of claim 14, wherein a dynamic display speed of the target image region of the succeeding image in the second display effect is determined at least according to a depth of field of the target image region.

18. The image display device of claim 13, wherein a background of the succeeding image is obtained by segmenting the succeeding image into a foreground region and a background region and performing image complementation on the background region.

19. The image display device of claim 13, wherein before displaying a foreground target of the succeeding image, the method further comprises:
determining an image coincidence degree of a foreground target of the preceding image and a foreground target of the succeeding image in a target position relationship; and
turning over, when the image coincidence degree reaches a preset image coincidence degree threshold, the foreground target of the succeeding image in a specified turning manner.

20. An image display apparatus, comprising:
one or more processors; and a memory configured to store one or more programs;
wherein when the one or more programs are executed by the one or more processors, the one or more processors are caused to perform operations of:
determining a display order of a plurality of to-be-displayed images; and
displaying, in the display order, the plurality of to-be-displayed images,
wherein for each pair of adjacent images in the plurality of to-be-displayed images, a preceding image is displayed in a first display period corresponding to the pair of adjacent images, a foreground target region of a succeeding image is displayed as being superimposed on the preceding image in a second display period corresponding to the pair of adjacent images, the succeeding image comprises a video image sequence or a single image, the succeeding image is displayed in a third display period corresponding to the pair of adjacent image, a target image region of the succeeding image enters a display interface according to a specified first display effect, and the target image region of the succeeding image comprises a foreground target of the succeeding image or a background of the succeeding image, and
wherein the third display period corresponding to a pair of adjacent images is the first display period corresponding to the next pair of adjacent images.

* * * * *